Patented Oct. 2, 1934

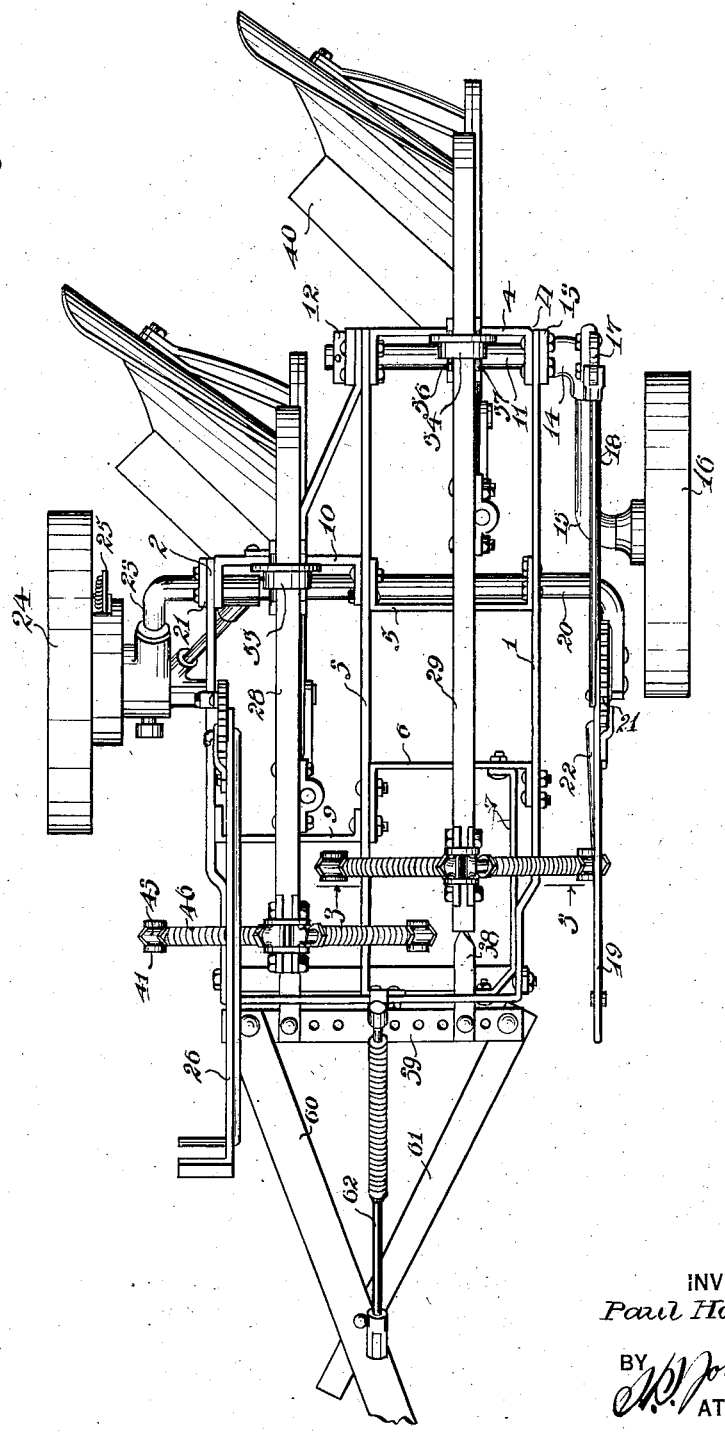

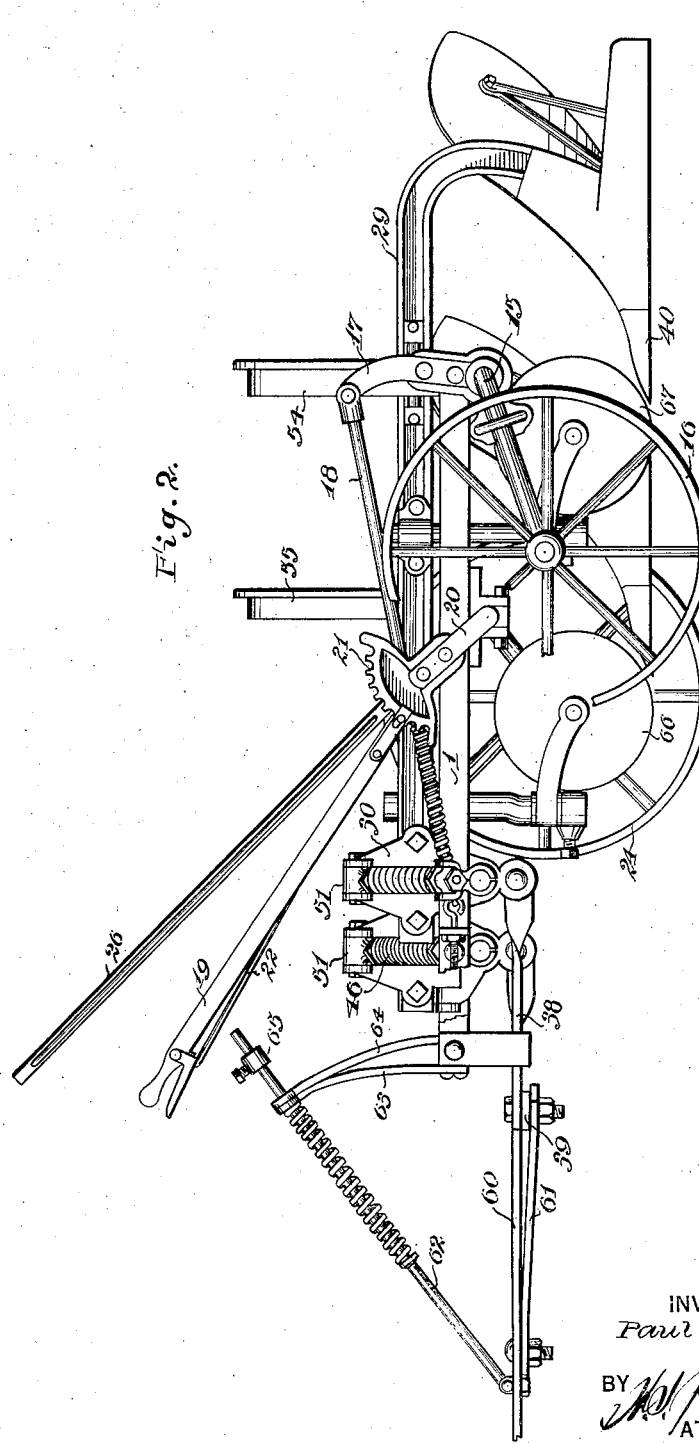

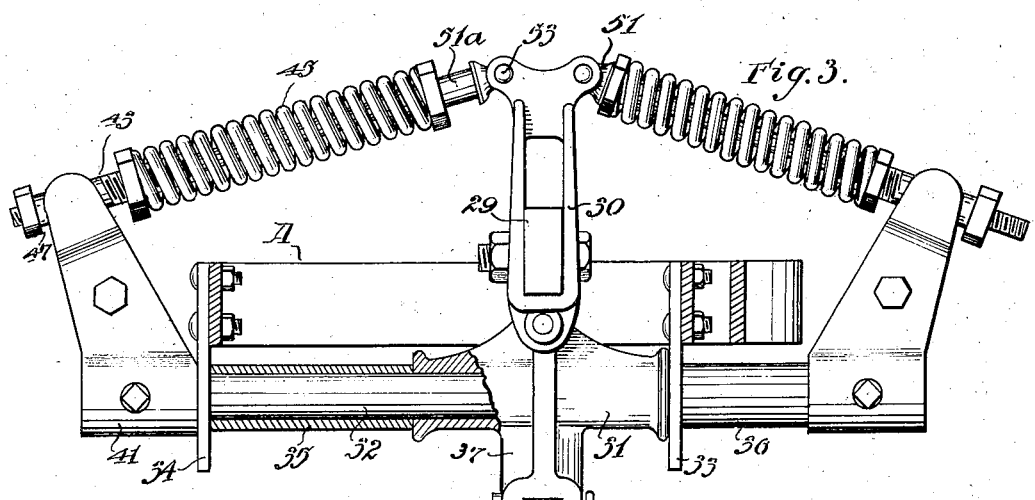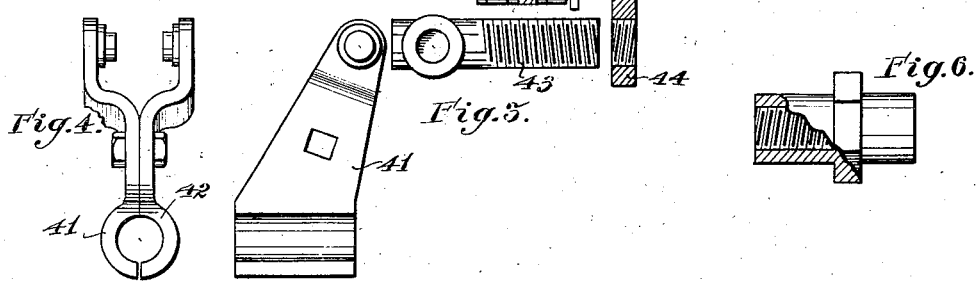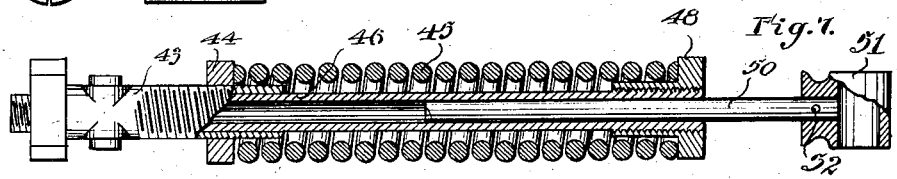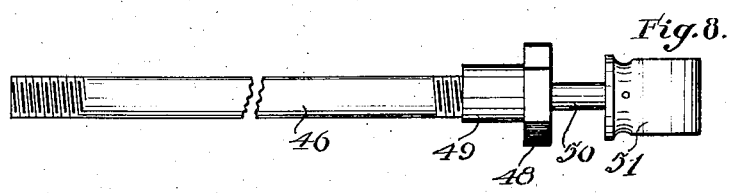

1,975,271

UNITED STATES PATENT OFFICE 1,975,271

PLOW

Paul Hansmann, Long Prairie, Minn.

Application April 3, 1933, Serial No. 664,171

5 Claims. (Cl. 97—128)

The present invention relates to a plow, and more particularly to a plow for use in stony ground.

In the plowing of ground having stones and other obstacles such as portions of stumps buried therein, the plow frequently hooks one of these objects and either stops the plow or breaks some portion thereof.

An object of the present invention is to make a plow having means adapted to normally hold the plow in a normal position for plowing, but permitting movement of the plow when subjected to abnormal stresses at an acute angle to the line of draft to permit the plow to avoid obstacles encountered in the ground.

In order to attain this and other objects of my invention, which will be brought out in the present specification, a plow is mounted on a plow beam of an ordinary type, and is hingedly connected to a wheeled carriage, the plow beam being swiveled to the carriage to permit a limited oscillation about the longitudinal axis of the carriage, and to permit a limited vertical movement of the plow with respect to the carriage. Resilient positioning means are mounted to normally hold the plow against oscillation about the longitudinal axis of the carriage, while the weight of the plow, and the pressure of the ground thereon, normally hold the plow against vertical displacement.

These and other features of the invention will be more fully brought out in the following description and the accompanying drawings, wherein:

Figure 1 is a plan view of a plow embodying the present invention.

Figure 2 is a view in side elevation of the structure shown in Figure 1, a portion of one of the wheels being broken away to show the operative mechanism of the structure.

Figure 3 is a sectional view on the line 3—3 of Figure 1.

Figure 4 is a view in end elevation of a yoke used to support the resilient lateral support for the plow beam.

Figure 5 is a view in side elevation showing the inside of one of the two halves of the yoke illustrated in Figure 4, and also shows a pipe supporting sleeve which is swiveled in the yoke and a spring supporting nut which is threadedly mounted on this sleeve.

Figure 6 is a view in side elevation of a pipe supporting sleeve.

Figure 7 is a view in longitudinal section of the resilient stabilizing mechanism; and Figure 8 is a view in side elevation of portions of the structure shown in Figure 7.

Referring to the drawings in detail, the plow frame A comprises a main frame member 1 formed of a continuous bar of steel extending from the left rear corner of the plow forwardly to the front thereof, thence across the front of the plow and rearwardly to the point 2 at the rear of the frame on the right hand side of the plow. A longitudinal center frame member 3 is bolted to approximately the center of the forward portion of the main frame member 1 and extends rearwardly the same distance as the longer left hand side of the main frame member 1. A transverse frame member 4 is bolted across between the rear ends of the left side of the main frame member 1 and the rear of the center frame member 3. Additional transverse frame members 5 and 6 are mounted on this bay formed between the left side of the main frame member 1 and the center frame member 3 and an additional bracing member 7 is connected to the front of the main frame member 1 and to the transverse bracing member 6 to absorb the stresses imposed by the pulling of the plow and to prevent these stresses from straightening the bent portion 8 in the left side of the main frame member 1. Transverse bracing members 9 and 10 are positioned in the bay between the central frame member 3 and the right hand side of the main frame member 1. A rear axle member 11 is mounted in a pair of bushings 12 and 13 secured to the frame, this axle member being bent at 14 to extend forwardly and again at 15 laterally outwardly and a wheel 16 is supported on the outwardly bent portion of the axle for rotation thereon. A lever arm 17 extends upwardly from the axle and is securely connected thereto so as to rotate therewith. From the upper end of this lever a link 18 extends forwardly and is connected to a hand lever 19 by means of which the axle 11 may be moved to raise or lower the wheel 16 with respect to the plow frame A. This lever 19 is mounted for pivotal motion on the upwardly bent end of a forward axle 20 and a toothed segment 21 is provided which is engaged by a manually operable locking bar 22 mounted on the lever 19 so as to permit independent movement of the lever 19 with respect to the forward axle 20. The forward axle 20 is supported in bushings 21 connected to the plow frame and the right hand end of this forward axle member is bent downwardly as at 23 and has an ordinary type of self lifting plow wheel 24 mounted on the end thereof. This plow wheel 24 is of a type customarily employed in self-lifting plows wherein the hub of the wheel is provided with a toothed segment, not shown, which is engaged by a pawl connected to a lever 25 and having an automatic pawl releasing means so that when the lever 25 is actuated to cause the pawl to engage with the toothed segment, the rotation of the wheel 24 will cause the axle 23 to rotate a predetermined distance to lift the plows from the ground and will then be automatically released. This type of self-lifting mechanism is of a type well known to the art and is not essential to the present invention, and it is, therefore, believed unnecessary to illustrate and describe this mechanism in detail.

A lever 26 is pivotally mounted on the right side of the main frame member 1 and is connected by means of a link 27 to a lever arm, not shown, on the right hand wheel axle. By means of this lever the height of the wheel with respect to the frame A may be adjusted as to its maximum and minimum height. This construction is also well known in the art of plow making and it will be unnecessary to describe this mechanism in detail.

A pair of plow beams 28 and 29 are mounted in the frame so as to be free for vertical movement independently of the carriage and frame and also free for lateral oscillation. Each of the plow beams is mounted at its forward end in a U-shaped housing 30, see Figure 3, which is pivoted for lateral movement on a support member 31 which is in turn pivotally mounted for oscillation in a vertical plane longitudinally of the plow on a transverse shaft 32. The shaft 32 upon which is mounted the left hand plow members is mounted in a pair of plates 33 and 34 bolted to the central longitudinal frame member 3 and to the longitudinal bracing member 7 and the right hand plow beam is similarly mounted in plates connected to the longitudinal frame member 3 and the right side 2 of the main frame. Tubular spacing members 35 and 36 are mounted on the shaft 32 to hold the oscillatory support member 31 in position thereon. The oscillatory support 31 has a downwardly extending portion 37 which is connected by means of a link 38 to the draw bar 39 of the plow so that a forward pull on the draw bar tends to rotate the oscillatory member 31 so as to force the upper portion thereof which supports the laterally oscillable member 30 in which the plow beam 29 is secured rearwardly, thus forcing the plow share 40 downwardly. Upon each of the outer ends of the shaft 32 is secured a pair of plates 41 and 42 between each pair of which are pivotally supported a bushing 43 threaded exteriorly thereof. A nut 44 is screwed onto this threaded portion to support a coiled compression spring 45. A tubular member 46 is slidably inserted interiorly of the pivotally supported bushing 43, being threaded on both ends thereof. A nut 47 is threaded onto the outer end of each of the tubular members 46 and a second nut 48 having an interiorly threaded extension 49 thereon is threadedly mounted on the other end of the tubular member 46 so as to hold the coil spring 45 in compression between this nut and the nut 44 threadedly mounted upon the bushing 43. A rod 50 is slidably mounted in the tubular member 46 and is provided with a head 51 securely connected thereto as by means of a pin 52, the head having a transverse opening therethrough to receive a bolt 53 by means of which the head 51 is pivotally connected to the plow share support member 30. The compression springs 45 normally hold the plow share support member 30 in a vertical position. However, should the plow strike a hard object, such as a rock, imbedded in the ground, lateral pressure on the plow will permit the beam to swing to one side or the other, the tubular member 46 sliding outwardly through the bushing 43 and compressing the coil spring 45. Upon the removal of this undue pressure the coil spring 45 will expand to its original length to restore the plow beam to a vertical position. A U-shaped guide member 54 is secured to the rear transverse frame member 4 and a second similar U-shaped guide member 55 is secured to the rear transverse frame member 10. The plow shares are mounted in these U-shaped members to be freely movable vertically therein, being limited in their downward movement by the transverse frame members 4 and 10, respectively, upon which the plow beams 28 and 29 normally rest. A pair of rollers 56 and 57 may be mounted on each side of the plow beams so as to permit free vertical movement of the plow beams within these U-shaped guide members 54 and 55. Should the plow strike an obstruction in the ground which would tend to raise the plow vertically, this vertical movement would be permitted by these U-shaped guide members, and, upon passing the obstruction, the natural downward pressure on the mold board of the plow, together with the downward pull imposed on the plow by the downward extension 37 of the longitudinally oscillable member 31, as previously described, would again force the plow into the ground to the predetermined depth, the plows being limited in their downward movement, as hereinbefore described, by the transverse frame members 4 and 10. The depth of both of the plow wheels with respect to the frame is controlled by the lever 26 and associated mechanism in a well known manner. Independent adjustment of the left hand wheel of the plow may be secured by means of the lever 19 and the link 18 to control the depth of the left hand plow wheel 16 relatively to the right hand plow wheel 24. The draw bar 39 is bolted to the forward end of the levers 38 and a draw link 60 is connected to one end of the draw bar, and a second draw link 61 is secured to the opposite end of the draw bar and also to the link 60. These links are held in a predetermined position by means of a rod 62 which is connected to the links and is slidably inserted in a pair of support arms 63 and 64 secured to the front of the plow frame. A collar 65 limits the downward movement of the rod 62. A pair of coulters 66 and 67 are mounted one forwardly of each plow share in the customary manner, except that it is preferable to mount the coulters in this type of plow somewhat closer to the point of the plow share so that upon striking any obstruction in the ground the coulters will roll over the obstruction and raise the plow share sufficient to pass the obstruction. Where it is desired to use plows of different widths interchangeably, such as a twelve and fourteen inch bottom, the bushings 35 and 36, see Figure 3, which determine the position of the plow shares may be interchanged so that by interchanging these tubular positioning members the longitudinally oscillable supports may be moved to the right or left, thus moving the plow share which is supported upon this longitudinally oscillable member. It will be noted in Figure 3 particularly that the head portion 51a of the left hand tubular slidable support member is longer than the right hand one 51. By reversing the position of these head members and placing the longer one upon the right hand side and the shorter one upon the left hand side, as they appear in the drawings, the plow share will be moved to the left a distance equal to the difference between the length of the long head 51a and the length of the short head 51. By making the difference in length between these two heads one inch, and by reversing the heads of both of the plow beams a difference of two inches in the separation of the plow beams will be provided. Thus, by placing the beams in the extreme outwardly position for a fourteen-inch plow bottom and by positioning them in an extreme inward position for a twelve-inch plow bottom, a proper adjustment may be readily obtained.

The present invention provides a plow which may be used in stony ground without danger of injuring the plow shares by hooking a rock and the sudden stoppage of the tractive means, and one which will permit the plows to oscillate laterally when striking an obstruction in the ground.

I claim:

1. A plow of the character described, comprising a frame, a wheeled support therefor, a laterally tiltable vertically oscillatable plow beam support mounted on said frame, resilient means mounted to normally hold said plow beam support in a vertical position, a plow beam mounted in said support, extending rearwardly therefrom, and a vertical guide member mounted on said frame rearwardly of said laterally tiltable support to retain said plow beam against lateral movement to permit a vertical movement of said plow beam.

2. A plow of the character described, comprising a wheeled frame, a transverse shaft mounted thereon, a support member pivotally mounted on said shaft and having a downwardly extending portion, means connecting the downwardly extending portion to the draw bar of said plow, a laterally movable member mounted on said support member, resilient means mounted to hold said laterally movable member in an upright position, and a plow beam connected to said laterally movable member.

3. A plow of the character described, comprising a wheeled frame, a transverse shaft mounted thereon, a support member pivotally mounted on said shaft and having a downwardly extending portion, means connecting the downwardly extending portion to a draft member of said plow, a plow beam support member pivotally mounted on said first support member to pivot in a vertical plane at right angles to the longitudinal axis of said plow, and resilient means mounted to normally retain said plow beam support member in an upright position.

4. A plow of the character described, comprising a frame, a member mounted for longitudinal and lateral pivotal movement thereon, a plow beam connected to said pivoted member, resilient means mounted to normally hold said pivoted member in a vertical plane longitudinally of the frame, a frame member mounted to limit the downward movement of said plow beam, and a guide member mounted to permit limited vertical movement of said plow beam upwardly from said frame and to prevent lateral movement of said plow beam.

5. In a plow of the character described, a plow beam support comprising a shaft positioned transversely of the plow frame, a support member pivotally mounted on said shaft to be pivotally movable in a vertical plane longitudinally of said plow, a second support member pivotally mounted on said first support member and pivoted for movement in a vertical plane transversely of said plow beam, a plow beam mounted in said second support member, an arm mounted on each end of said transversely mounted shaft, a swiveled bushing carried in each of said arms, a tubular plunger slidably inserted in said bushing, means to limit the outward movement of said tubular plunger, resilient means resisting the downward movement of said plunger, and a slidable member mounted in each of said tubular plungers and connected on opposite sides of said second support member to normally retain said second support member in an upright position with respect to said plow frame.

PAUL HANSMANN.